(No Model.) 2 Sheets—Sheet 1.
G. S. RESSLER.
COMBINED BAKING, ROASTING, AND FRYING PAN.
No. 422,156. Patented Feb. 25, 1890.
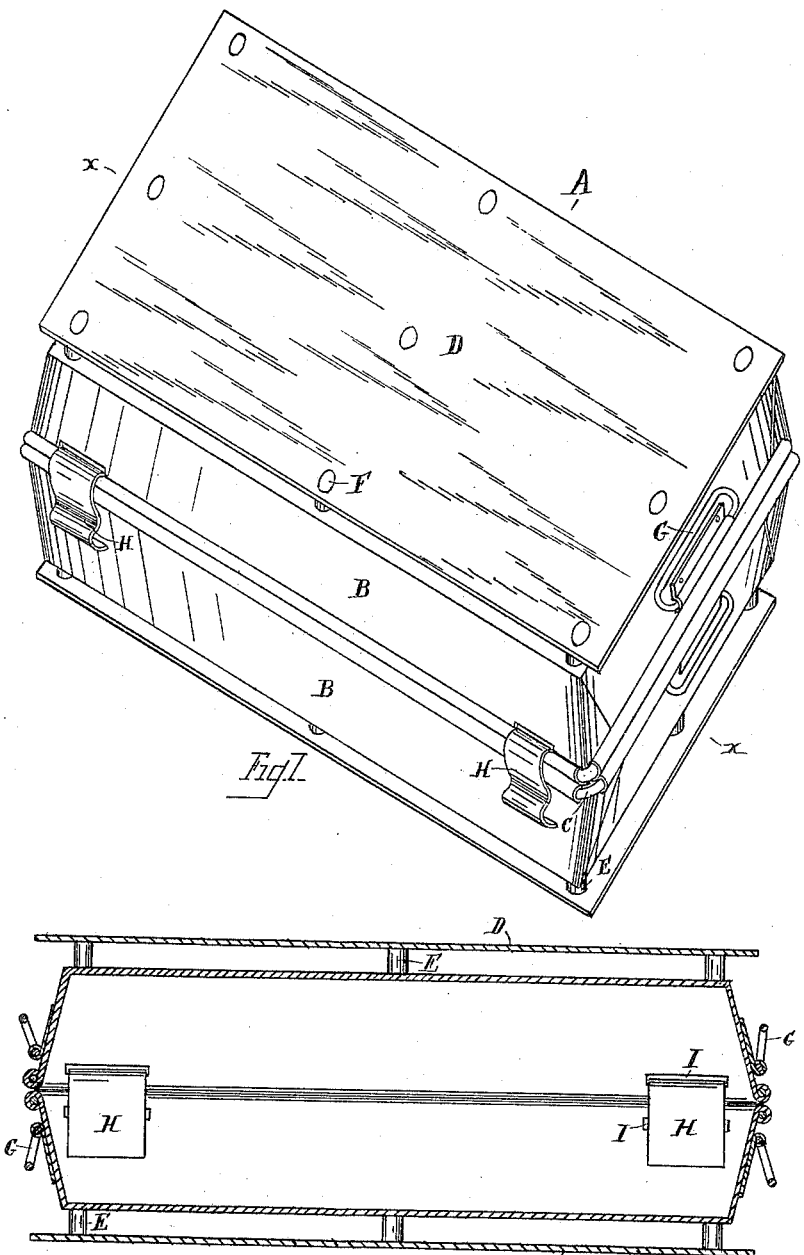
WITNESSES
Carroll J. Webster.
Anna J. Lehaney.
INVENTOR
George S. Ressler
By William Webster
Atty (No Model.) 2 Sheets—Sheet 2.

G. S. RESSLER.
COMBINED BAKING, ROASTING, AND FRYING PAN.

No. 422,156. Patented Feb. 25, 1890.

WITNESSES
Carroll J. Webster.
Anna J. Lehaney

INVENTOR
George S. Ressler
By William Webster
Atty

UNITED STATES PATENT OFFICE.

GEORGE S. RESSLER, OF TOLEDO, OHIO.

COMBINED BAKING, ROASTING, AND FRYING PAN.

SPECIFICATION forming part of Letters Patent No. 422,156, dated February 25, 1890.

Application filed April 22, 1889. Serial No. 308,148. (No model.)

*To all whom it may concern:*

Be it known that I, GEORGE S. RESSLER, a citizen of the United States, and a resident of Toledo, in the county of Lucas and State of Ohio, have invented certain new and useful Improvements in a Combined Baking, Roasting, and Frying Pan; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a combined baking, roasting, and frying pan, and is designed for use in an ordinary oven or on the top of the stove or range.

The objects of the invention are to provide a covered pan composed of two sections, exact duplicates in construction, and connected together to form a covered dish by means of detachable hinges, formed in a manner to allow the two sections to be detached or moved longitudinally with respect to each other when attached.

A further object is to form each section with a supplemental plate attached some distance from the bottom thereof, whereby to raise the bottom of the pan from the bottom of the oven to prevent an unequal heat at this point, and to prevent too great heat from the top by means of the plate upon the inverted top pan, this construction also allowing the sections to be interchangeable or adapted to be used singly.

The invention consists in the parts and combination of parts hereinafter described, and pointed out in the claims.

Figure 3:
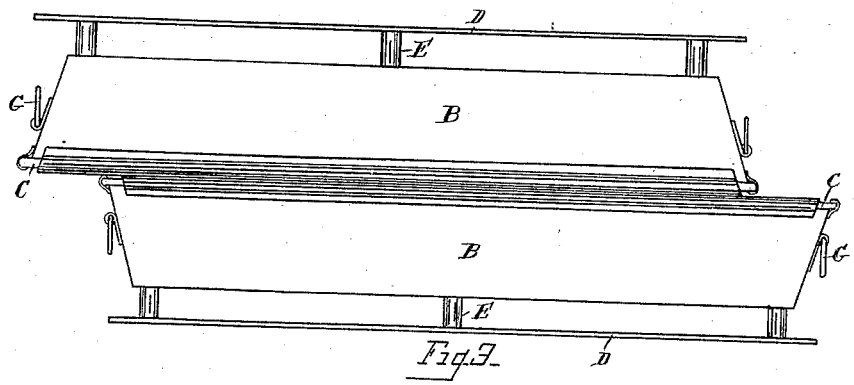
Figure 4:
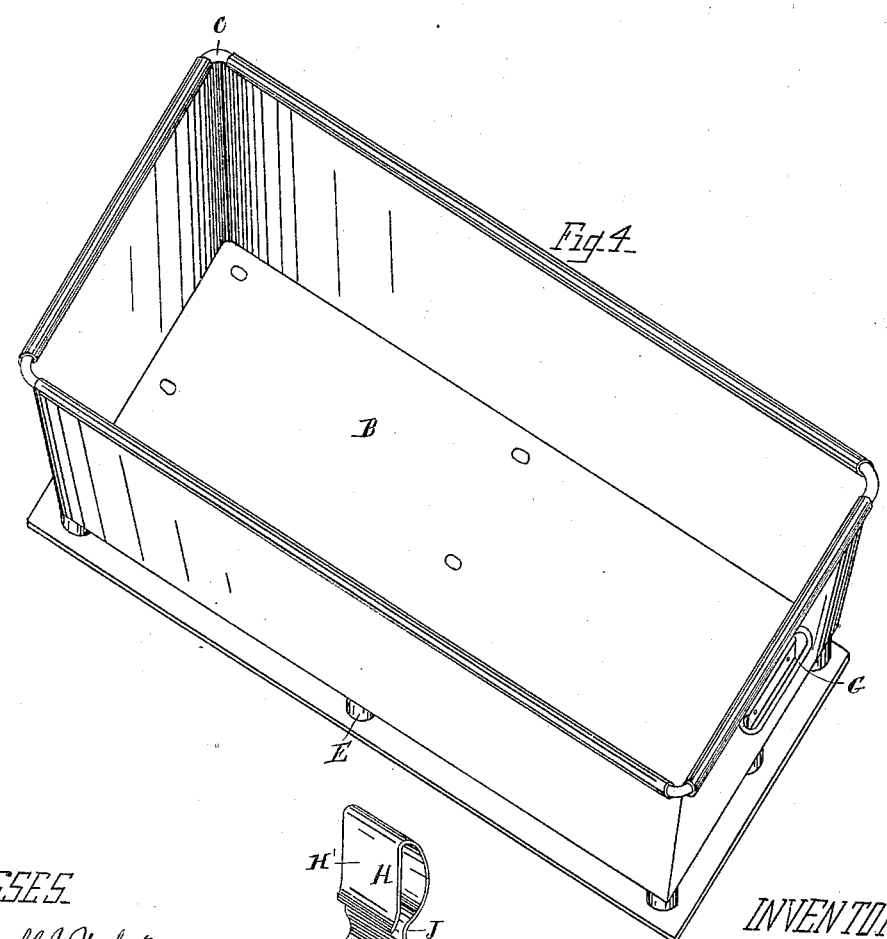
Figure 5:
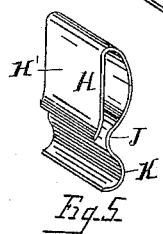

In the drawings, Figure 1 is a perspective view of pan with the two sections assembled. Fig. 2 is a longitudinal vertical section on lines *x x*, Fig. 1. Fig. 3 is a side elevation of the covered pan, showing the upper section moved longitudinally upon the lower section. Fig. 4 is a perspective view of one section of pan. Fig. 5 is a detail view of one of the detachable hinges.

As the sections are identical in construction, a description of one will serve for both.

A designates a pan formed with outwardly-inclined sides B surrounding the same, the upper edges being preferably bent to surround a wire C to strengthen the same and form a smooth surface upon which the edge of the top pan may move, as will be more fully explained. Upon the bottom of the pan is secured a plate D, of the same area as the top of the pan. The pan is sustained at some distance above the plate by means of short tubes E, through which are passed rivets F. Each pan is formed with handles G in the usual manner.

H designates a detachable hinge constructed to allow of being attached to either pan, and to permit the pans to be moved longitudinally with respect to each other, and to be detached from both pans at will. Hinge H is formed with a hook portion H', adapted to be inserted into a rectangular slot I in the pan, and with a depending inwardly-curved portion J coincident with the end of the hook portion, and with an additional curve K to cause the end to bear frictionally against the side, whereby to steady the hinge in a longitudinal movement upon the side of the pan.

In operation, when the article to be baked—whether of meat, vegetables, or bread—is placed within the bottom pan, the hinge is placed with the hook portion H' projecting through slot I, and the edge of the top pan is forced between the hook portion H' and the curved portion J and K, and the pans are turned one upon the other, forming a closed pan. The hook portion H', if desired, may be inserted in the slot in the top pan, and then forced down upon the top edge of the lower pan, bringing the said upper edge between the lower end of the hook portion and the curved portion J, the curved part K bearing upon the side of the lower pan to steady the hinge-hook when the pans are slid longitudinally in opposite directions. The pan, when placed within the oven, by being closed upon the article to be cooked retains the flavor thereof, and the water placed therein is vaporized, whereby the article is kept moist and juicy. The bottom plate prevents the heat from the bottom of the oven from burning the article in the pan, the top plate serves the same purpose with respect to the top, while the projecting inclinations of the four sides cause the heat from the sides of the oven to be received thereby and radiated to the interior of the pan, thereby causing an even temperature throughout the interior of the same.

When it is desired to look into the pan to observe the condition of the article being cooked, the top pan is moved longitudinally upon the bottom pan, as shown in Fig. 3, the hinges sliding freely and permitting this movement; or should it be desired to brown the top of a roast the top can be removed in the same way.

By constructing the pans as exact duplicates they are rendered interchangeable, and by reason of the removability of the hinges they can be used singly.

What I claim is—

1. A baking-pan formed of two sections, one inverted upon the other and secured by spring-hinges, each pan having a deflecting-plate secured to its bottom, said plate being of an area equal to the bottom of the pan, and held a sufficient distance from said bottom by suitable tubes or posts, substantially as shown and described.

2. In a baking-pan, two sections, each section being formed with slots upon the side, in combination with detachable hinges formed with a hook portion at one end adapted to be inserted in the slot of one pan, and a curved spring portion at the opposite end adapted to hold and bear upon the upper edges of the other pan, said curved portion being coincident with the lower end of the hook portion, as and for the purpose set forth.

3. In a baking-pan, the combination, with two pans of similar shape and size, one inverted upon the other and having its sides slotted, of a spring-hook hinge formed of a single piece bent upon itself and having its members convergent, one member being inserted in the slot of one pan and the other bearing upon the outer side of the other pan, as and for the purpose set forth.

In testimony that I claim the foregoing as my own I hereby affix my signature in presence of two witnesses.

GEORGE S. RESSLER.

Witnesses:
WILLIAM WEBSTER,
J. F. ECKHARDT.